United States Patent
Ender

(10) Patent No.: US 9,144,949 B2
(45) Date of Patent: Sep. 29, 2015

(54) MOLDING TOOL AND METHOD FOR MANUFACTURING A FIBER REINFORCED PLASTIC AERODYNAMIC AIRCRAFT COMPONENT

(71) Applicant: Airbus Operations GmbH, Hamburg (DE)

(72) Inventor: Tobias Ender, Bremen (DE)

(73) Assignee: Airbus Operations GmbH (DE)

( * ) Notice: Subject to any disclaimer, the term of this patent is extended or adjusted under 35 U.S.C. 154(b) by 209 days.

(21) Appl. No.: 13/740,637

(22) Filed: Jan. 14, 2013

(65) Prior Publication Data

US 2013/0181374 A1    Jul. 18, 2013

Related U.S. Application Data

(60) Provisional application No. 61/586,878, filed on Jan. 16, 2012.

(30) Foreign Application Priority Data

Jan. 16, 2012 (DE) .......................... 10 2012 000 564

(51) Int. Cl.
*B29C 33/44* (2006.01)
*B29D 99/00* (2010.01)
*B29C 33/48* (2006.01)
*B64C 3/18* (2006.01)

(52) U.S. Cl.
CPC .............. *B29D 99/001* (2013.01); *B29C 33/44* (2013.01); *B29C 33/485* (2013.01); *B29D 99/0014* (2013.01); *Y02T 50/433* (2013.01)

(58) Field of Classification Search
CPC ...... B29C 70/30; B29C 70/446; B29C 33/44; B29C 33/485; B29D 99/0014; B29D 99/001; Y02T 50/43

See application file for complete search history.

(56) References Cited

U.S. PATENT DOCUMENTS

| | | | | |
|---|---|---|---|---|
| 1,368,862 A | * | 2/1921 | Traum | 425/57 |
| 1,371,525 A | * | 3/1921 | Strausbaugh | 249/186 |
| 1,645,729 A | * | 10/1927 | Vaughan | 249/186 |
| 2,247,537 A | * | 7/1941 | Warren | 249/149 |
| 2,359,471 A | * | 10/1944 | Ewing | 249/181 |
| 2,393,765 A | * | 1/1946 | Gilliam | 249/186 |
| 2,445,290 A | * | 7/1948 | Gonda | 428/188 |
| 2,503,431 A | * | 4/1950 | Bender et al. | 269/48.1 |
| 2,682,924 A | * | 7/1954 | Maquat et al. | 279/2.16 |

(Continued)

FOREIGN PATENT DOCUMENTS

EP    2377674 A1    10/2011

*Primary Examiner* — Matthew Daniels
(74) *Attorney, Agent, or Firm* — Lerner, David, Littenberg, Krumholz & Mentlik, LLP

(57) ABSTRACT

A molding tool for manufacturing a fiber-reinforced plastic aerodynamic aircraft component, which aircraft component, in order to form several bays arranged on the inside and delimited by an outer skin and spars arranged spaced apart from each other, in each case includes a multi-part mold core that matches the shape of the respective bay, wherein to conform to local skin reinforcements and/or spar reinforcements that extend into at least one of the bays, the multi-part mold core includes four or five core parts, of which two core parts comprising a triangular cross section are arranged along opposing edges of the bay, which edges interact with two or three core parts that fill the space between the two triangular core parts, which space extends diagonally relative to the bay.

1 Claim, 2 Drawing Sheets

(56) References Cited

U.S. PATENT DOCUMENTS

| | | | | |
|---|---|---|---|---|
| 2,818,618 A | * | 1/1958 | Winship et al. | 249/186 |
| 2,827,683 A | * | 3/1958 | Benart et al. | 249/180 |
| 3,028,292 A | * | 4/1962 | Hinds | 156/214 |
| 3,476,351 A | * | 11/1969 | Burdett | 249/82 |
| 3,565,390 A | * | 2/1971 | Beasley | 249/180 |
| 3,754,717 A | * | 8/1973 | Saidla | 242/437.3 |
| 3,767,157 A | * | 10/1973 | Davis | 249/186 |
| 3,844,526 A | * | 10/1974 | McCracken | 249/152 |
| 4,286,766 A | * | 9/1981 | von Holdt | 249/144 |
| 4,570,896 A | * | 2/1986 | Strickland et al. | 249/27 |
| 4,614,326 A | * | 9/1986 | Strickland et al. | 249/180 |
| 5,087,187 A | * | 2/1992 | Simkulak et al. | 425/112 |
| 5,387,098 A | * | 2/1995 | Willden | 425/393 |
| 5,547,629 A | * | 8/1996 | Diesen et al. | 264/257 |
| 5,817,269 A | * | 10/1998 | Younie et al. | 264/258 |
| 2005/0230552 A1 | * | 10/2005 | Engwall et al. | 244/133 |
| 2010/0075074 A1 | * | 3/2010 | Wilson et al. | 428/34.1 |
| 2011/0168324 A1 | | 7/2011 | Ender | |

* cited by examiner

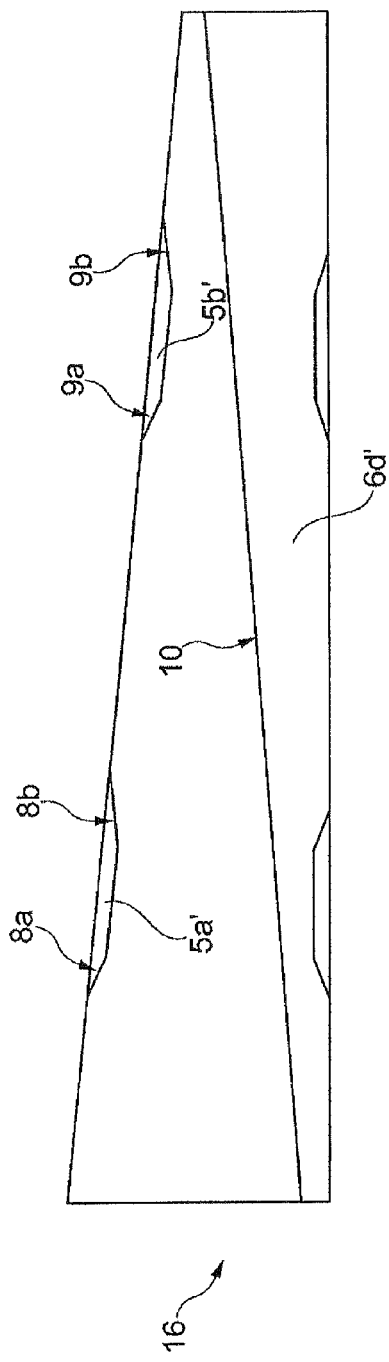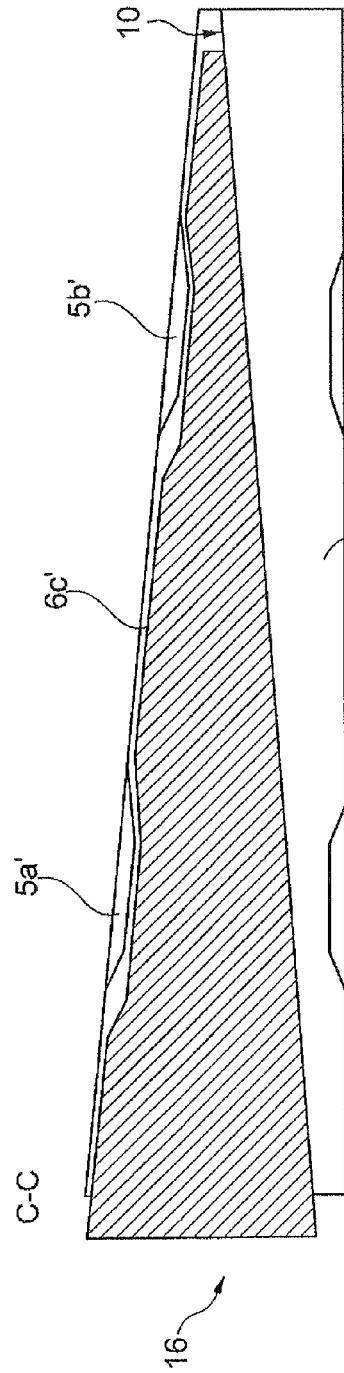
Fig. 3a
Fig. 3b

MOLDING TOOL AND METHOD FOR MANUFACTURING A FIBER REINFORCED PLASTIC AERODYNAMIC AIRCRAFT COMPONENT

CROSS-REFERENCE TO RELATED APPLICATIONS

This application claims the benefit of filing date of U.S. Provisional Patent Application No. 61/586,878 filed Jan. 16, 2012, the disclosure of which is hereby incorporated herein by reference.

TECHNICAL FIELD OF THE INVENTION

The invention relates to a molding tool for manufacturing a fiber-reinforced plastic aerodynamic aircraft component, which aircraft component, in order to form several bays arranged on the inside and delimited by an outer skin and spars arranged spaced apart from each other, in each case comprises a multi-part mold core that matches the shape of the respective bay. Apart from this, the invention also relates to a method for manufacturing such an aircraft component with the use of the molding tool.

BACKGROUND OF THE INVENTION

In the field of aircraft construction the classic aluminum materials are increasingly displaced by the use of fiber-reinforced composite materials that comprise, for example, carbon-fiber-reinforced duroplastic or thermoplastic synthetic materials. Often already complex structural components such as flaps or entire vertical stabilizers are manufactured throughout using such fiber-reinforced composite materials, in particular using CFRP materials.

Because of their spatial dimensions or their complex geometric shape such aerodynamically formed aircraft components are, as a rule, made in the so-called differential construction, in which the aircraft components need to be assembled, in a final installation step, from a multitude of prefabricated individual components of simpler geometric shapes.

In this context a landing flap for an aircraft is mentioned as an example of the aforesaid, in which landing flap on several spars that are spaced apart from each other so as to be parallel and that extend in longitudinal direction, a multitude of ribs, which extend across the aforesaid, are fastened to support the outer skin. Lastly, the surface geometry of the aircraft component is defined by the outer contour of the ribs and the shape of the outer skin, and thus the aerodynamic behavior of the landing flap is determined. Moreover, all the components need to be installed in a strain-free manner in order to avoid introducing additional loads into the structure.

This differential construction is associated, among other things, with one disadvantage in that the individual parts need to be joined in an additional installation step to form the finished component. Furthermore, the connection process generally requires overlaps or flanges between the individual components, which overlaps or flanges are associated with corresponding additional weight of the aircraft component.

Further disadvantages arise as a result of the riveted joint of the individual components, which riveted joint is used as a rule. Because fiber-reinforced composite components have considerably lower strengths of the hole walls when compared to those of metallic materials, each rivet hole represents a disadvantage in terms of statics, which disadvantage needs to be compensated by greater materials thicknesses in the region of the hole. To make the use of such riveted joints possible at all on fiber-reinforced composite components, it is necessary, for example on shell structures, to also provide greater material thicknesses and enlarged flange regions so that in the case of failure of the riveted joint it is indeed possible to effect repair work by creating a further connection. All these limitations result in the aircraft component not being designed with regard to the maximum mechanical load to be expected, but instead with regard to manufacturing constraints, an approach which unnecessarily results in greater weight.

In principle the structural components of an aircraft component can also be joined by bonding, whereby at least the problem of the reduced strength of the hole walls is eliminated. However, the so-called structural bonding of highly loaded components of an aircraft is still associated with considerable problems in terms of the required surface pre-treatment, fatigue resistance, and resistance to impact loads, which problems, for safety reasons, at present do not yet make possible its use in the field of civil aviation.

The so-called integral construction represents a feasible alternative to the differential construction; in integral construction fiber-reinforced composite components of complex geometric shape are made in a single piece so that the above-mentioned disadvantages resulting from connecting a multitude of individual parts to form a complex overall structure do not apply.

One problem in the manufacture of such aircraft components, which can, for example be complete flaps, airbrakes, ailerons, flap tracks, slats, engine mounts, winglets, wings or airfoils, tail units, control surfaces and the like, is associated with the undercut structures, which in many cases are necessary to create the necessary stiffening reinforcement within the closed outer skin. These undercut structures can be skin reinforcements and spar reinforcements that extend into the interior of the essentially hollow aircraft component.

From DE 10 2008 013 759 A1 a technical solution to this undercut problem in the manufacturing of fiber-reinforced aircraft components in integral construction is known. To make industrial production of such aircraft components possible requires mold cores that after manufacture of the aircraft component can be removed from said component without any resistance. It has been proposed to prefabricate mold cores from a soluble material in a core shape. In this arrangement these mold cores reproduce the inner surface geometry of the aircraft component. Subsequently, preforms comprising reinforcement fibers are placed onto these mold cores in order to form stiffening elements and to arrange the mold cores to form an overall structure. Subsequently a web-shaped semi-finished product is placed onto the mold cores in order to create the outer skin. The overall structure is then placed in a closed mold tool and is infiltrated by a curable plastic matrix. This infiltration process, which is known per se, is also referred to as an RTM process. After the overall structure has cured to become the finished fiber-reinforced composite component with the application of pressure and temperature, the mold cores are removed by releasing them from the fiber-reinforced composite component.

While with this approach it is possible to control undercut contours in aircraft components of the type of interest in the present context, it appears, however, that manufacture of the soluble mold cores is quite elaborate and said mold cores can only be used once.

Apart from the above, from the generally-known state of the art multi-part mold cores are known that comprise a solid material, for example an aluminum alloy, and that divide the cross section of the mold core into at least nine core parts per bay. In the case of a nine-piece mold core, in a cross section of a bay, which cross section is rectangular as a rule, there is thus a center core part which after curing of the aircraft component needs to be pulled from the bay first, before the remaining core parts, which in each case are in contact with the outer skin or with the spars, can be removed, in that they are first pushed in the direction of the removed center core part in order to overcome undercuts, and are subsequently pulled longitudinally from the bay.

As a result of the large number of core parts the expenditure for cleaning the mold core comprising said core parts increases. Furthermore, in the case of trapezoidally tapering flaps the cross section of the individual core parts becomes quite thin, which makes handling said core parts more difficult when manufacturing the aircraft component. Such thin core parts can easily bend.

Furthermore, multi-part mold cores comprising only three core parts are generally known; however, their application is limited to bays of aircraft components in which only the outer skin or only the spar comprises inwards-directed undercuts. Thus their field of application is correspondingly limited.

BRIEF SUMMARY OF THE INVENTION

An aspect of the invention relates to a molding tool for manufacturing an aircraft component comprising a fiber-reinforced plastic, with the multi-part mold core of said aircraft component providing good stability and being suitable for use in conjunction with undercuts in bays, which undercuts are formed by skin reinforcements and spar reinforcements.

An aspect of the invention includes the technical teaching according to which for conforming to local skin reinforcements and/or spar reinforcements that extend into at least one of the bays, the multi-part mold core of a generic molding tool comprises four or five core parts, of which two core parts comprising an essentially triangular cross section are arranged along opposing edges of the bay, which edges interact with two or three core parts that fill the space between the two triangular core parts, which space extends diagonally relative to the bay.

The solution according to an aspect of the invention provides an advantage in particular in that the individual core parts comprise a cross section that is sufficiently large so as not to become deformed in an unintended manner. Furthermore, the use of fewer core parts correspondingly reduces cleaning expenditure. To this extent the solution according to an aspect of the invention represents a compromise between the number of required core parts and its usability for reproducing skin reinforcements and spar reinforcements that extend into the bay of an aircraft component.

In the case of three space-filling core parts, in each instance two core parts that comprise a pentagon-shaped cross section should be arranged on the remaining facing edges, which core parts interact with a center core part that comprises a quadrangular cross section. It is thus possible that at first the center core part is removed during demolding, after which the two pentagon-shaped core parts, on the edge, can be removed from the space after having been lifted off from the undercuts. Finally, it is then also possible in a similar manner to remove the two triangular core parts from the bay.

In the case of two space-filling core parts, in each instance the two core parts that comprise a pentagon-shaped cross section are arranged on the remaining facing edges of the bay and in longitudinal direction comprises a complementary wedge shape. Thus it is possible for the core part, which in the direction of extension tapers off into the bay, to be removed first, after which the other core part, which is shaped so as to be complementary to the aforesaid, is removed. In this process the ramp slope of the undercut to be overcome when the wedge-shaped core part is pulled out must be adjusted to the angle resulting from the wedge shape.

According to another aspect of the invention, it is proposed that in the case of local spar reinforcements that extend only into one bay of adjacent bays of the aircraft component this bay comprise a mold core that comprises four or five core parts, whereas the other bay is to comprise a three-part mold core. The three-part mold core can be removed in that at first the center rectangular core part is pulled from the bay, after which the two remaining, rectangular, core parts are removed. In this manner in the case of several bays situated one beside another, taking into account the position of undercuts, the number of core parts required can be further reduced.

BRIEF DESCRIPTION OF THE DRAWINGS

Further measures that improve the invention are shown in more detail below with reference to the figures, together with a description of preferred exemplary embodiments of the invention. The following are shown:

FIG. 1—a diagrammatic partial cross section of a flap as an aircraft component with a bay, which as an example comprises undercuts, into which bay a mold core comprising five core parts has been inserted, FIG. 2—a diagrammatic partial cross section of a flap as an aircraft component with a bay, which as an example comprises undercuts, into which bay a mold core comprising four core parts has been inserted, FIG. 3a—a diagrammatic longitudinal section 3a-3a in the mold core according to FIG. 2, FIG. 3b—a diagrammatic longitudinal section 3a-3a in a mold core whose core part has partially been removed when compared to that in FIG. 3a.

DETAILED DESCRIPTION

Figure 1:
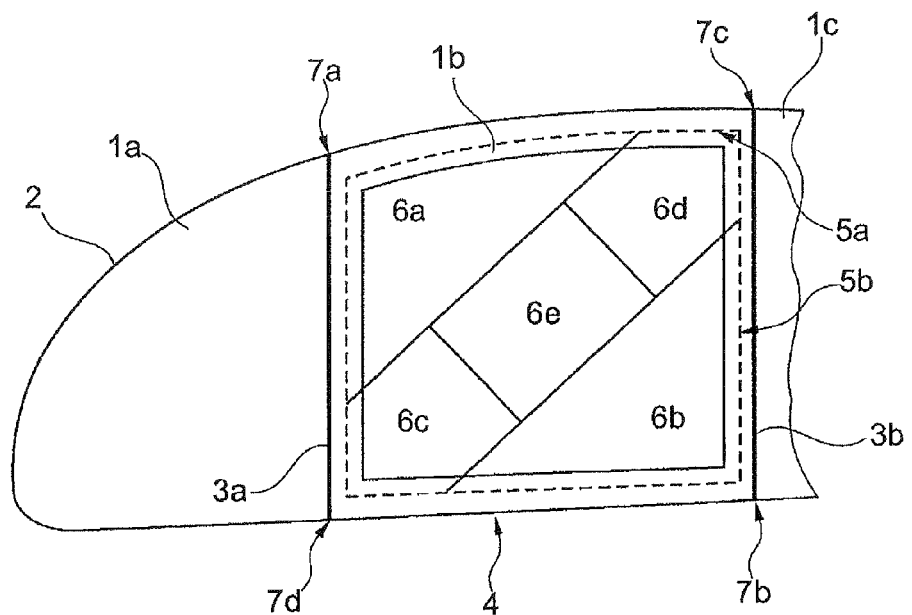

According to FIG. 1 the flap (only partially shown in the illustration) that is to be manufactured from a fiber-reinforced plastic comprises several bays 1a to 1c that are arranged side by side, which bays 1a to 1c are formed by an outer skin 2 and by spars 3a, 3b that are arranged so as to be spaced apart from each other. As an example, the bay 1b comprises a multi-part tool core 4 which during manufacture of the landing flap forms the interior contour at that location. The bay 1b with skin reinforcements 5a and spar reinforcements 5b that extend into it is locally narrowed in its cross section. To conform to the aforesaid a five-part mold core 4 is used in which two core parts 6a and 6b that comprise a triangular cross section are arranged along opposing edges 7a and 7b of the bay 1b. The two triangular core parts 6a and 6b interact with three core parts 6c to 6e which fill in the space between the two triangular core parts 6a and 6b, which space extends diagonally relative to the bay 1b.

Of the three space-filling core parts 6c to 6e two core parts 6c and 6d comprise a pentagon-shaped cross section and are arranged on the remaining opposing edges 7c or 7d of the bay 1b. The two pentagon-shaped core parts 6c and 6d interact with a central quadrangular core part 6e.

This special geometry of the core parts 6a to 6e makes it possible, for demolding, after pulling out the center core part 6e, to first remove the two pentagon-shaped core parts 6c and 6d. To this effect the two pentagon-shaped core parts 6c and 6d are first displaced in the direction of the volume that was previously taken up by the center core part 6e in order to overcome the undercuts formed by the skin reinforcements and spar reinforcements 6a and 6b. Subsequently the two pentagon-shaped core parts 6c and 6d can be pulled from the bay.

Figure 2:
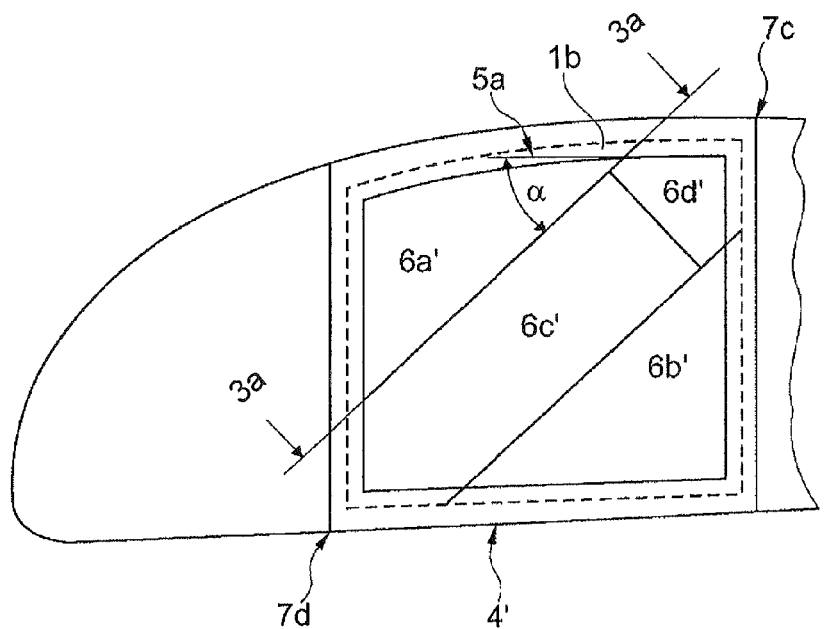

According to FIG. 2 in contrast to the embodiment described above the space between two triangular core parts 6a' and 6b' is filled with two core parts 6c' and 6d'. In each case the two pentagon-shaped core parts 6c' and 6d' are arranged at opposing edges 7d or 7c of the bay 1b. The angle α between the diagonally extending space and the skin reinforcement 5a present in the region of the bay 1b in this location ranges from 40° to 50°. Both space-filling core parts 6c' and 6d' are wedge-shaped in the direction of extension of the bay.

FIG. 3a shows the wedge-shape of the two space-filling core parts 6c' and 6d'. Within the bay 1b there are local skin reinforcements 5a' and 5b' that are arranged so as to be spaced apart from each other. On the edge side the skin reinforcements 5a' and 5b' comprise ramp-shaped chamfers 8a and 8b or 9a and 9b, of which the respective right-hand-side chamfer 8b and 9b is flatter than the respective other chamfer 8a and 9a of the skin reinforcements 5a' or 5b'. In this arrangement the flat chamfers 8b and 9b are at least parallel or, except for a small demolding angle, are aligned towards the boundary line 10 between the two core parts 6c' and 6d'.

According to FIG. 3b, in this manner the wedge-shaped core part 6c' can be removed first from the bay 1b, wherein the two skin reinforcements 5a' and 5b' do not offer any resistance to this. Finally, the other wedge-shaped core part 6d' can also be pulled from the bay 1b.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Bay
2 Outer skin
3 Spar
4 Mold core
5 Spar reinforcement
6 Core part
7 Edge
8 Chamfer
9 Chamfer
10 Boundary line

The invention claimed is:

1. A molding tool for manufacturing a fiber-reinforced plastic aerodynamic aircraft component comprising:
    first and second core parts each having a triangular cross section and configured for arrangement along a first set of opposed edges of a bay disposed within the fiber reinforced plastic aerodynamic aircraft component, the bay delimited by an outer skin and a plurality of spars; and
    third and fourth core parts each having a pentagonal cross section and being configured to interact with a second set of opposed edges of the bay and fill a diagonally extending space formed between the first and second core parts when the first and second core parts are arranged along the first set of opposed edges of the bay, the third core part having surface grooves defining a first ramp-shaped chamfer corresponding to a second ramp-shaped chamfer of a skin reinforcement of the outer skin or spar reinforcement of one of the plurality of spars, the first ramp-shaped chamfer being sloped such that the second ramp-shaped chamfer allows removal of the third core part from the diagonally extending space in a direction transverse to the second ramp-shaped chamfer.

* * * * *